United States Patent
Han et al.

(10) Patent No.: US 10,344,688 B2
(45) Date of Patent: Jul. 9, 2019

(54) APPARATUS AND METHOD FOR ENGINE CONTROL

(71) Applicant: HYUNDAI MOTOR COMPANY, Seoul (KR)

(72) Inventors: Dong Hee Han, Seoul (KR); Joowon Lee, Gwangju-si (KR); Hyungbok Lee, Seongnam-si (KR); Dong Ho Chu, Ansan-si (KR); Jong Il Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 205 days.

(21) Appl. No.: 15/342,307

(22) Filed: Nov. 3, 2016

(65) Prior Publication Data

US 2017/0350329 A1    Dec. 7, 2017

(30) Foreign Application Priority Data

Jun. 2, 2016    (KR) .................. 10-2016-0068777

(51) Int. Cl.
 *F02D 41/00*    (2006.01)
 *F02B 37/04*    (2006.01)
 (Continued)

(52) U.S. Cl.
 CPC .......... *F02D 41/0007* (2013.01); *F02B 33/34* (2013.01); *F02B 37/04* (2013.01);
 (Continued)

(58) Field of Classification Search
 CPC ....... F02D 41/0007; F02D 9/08; F02M 26/05; F02M 26/06; F02B 33/34; F02B 37/04; F02B 39/10
 See application file for complete search history.

(56) References Cited

U.S. PATENT DOCUMENTS

| 6,079,211 A * | 6/2000 | Woollenweber ...... F02B 37/025 60/602 |
| 2001/0054287 A1* | 12/2001 | Hoecker ................. F02B 37/04 60/612 |

(Continued)

FOREIGN PATENT DOCUMENTS

| FR | 2980526 A1 * | 3/2013 | ......... F02D 41/0087 |
| JP | 2004346910 A | * 12/2004 | |

(Continued)

OTHER PUBLICATIONS

JP 2007071136, Machine Translation, Translated on Jul. 2, 2018.*
FR 2980526, Machine Translation, Translated on Jul. 2, 2018.*

*Primary Examiner* — Patrick D Maines
(74) *Attorney, Agent, or Firm* — Morgan, Lewis & Bockius LLP

(57) ABSTRACT

An apparatus for controlling an engine includes an engine including a plurality of combustion chambers for generating driving torque by burning a fuel, a high-capacity turbocharger including a turbine rotated by the exhaust gas exhausted from the combustion chambers and a compressor rotated together with the turbine for compressing exhaust gas exhausted from the combustion chamber, an electric supercharger including a motor and an electric compressor operated by the motor, a throttle valve for adjusting an intake air amount supplied to the combustion chamber, a driving information detector for detecting driving information including a required torque and an engine speed, and a controller for determining a driving region of the engine from the driving information detected by the driving information detector, and controlling engine torque by adjusting an opening of the throttle valve and an output of the motor according to the driving region of the engine.

3 Claims, 4 Drawing Sheets

(51) Int. Cl.
- *F02D 9/08* (2006.01)
- *F02D 41/04* (2006.01)
- *F02B 39/10* (2006.01)
- *F02D 11/10* (2006.01)
- *F02B 33/34* (2006.01)

(52) U.S. Cl.
CPC ............ *F02B 39/10* (2013.01); *F02D 9/08* (2013.01); *F02D 11/105* (2013.01); *F02D 41/04* (2013.01); *F02D 2200/101* (2013.01); *F02D 2200/1004* (2013.01); *F02D 2200/602* (2013.01); *F02D 2250/18* (2013.01); *Y02T 10/144* (2013.01)

(56) References Cited

U.S. PATENT DOCUMENTS

| | | | | |
|---|---|---|---|---|
| 2006/0207252 | A1* | 9/2006 | Isobe | F02D 23/02 60/601 |
| 2008/0110170 | A1* | 5/2008 | Noodt | F02B 37/04 60/611 |
| 2013/0174545 | A1* | 7/2013 | Andrasko | F02B 37/12 60/602 |
| 2014/0130494 | A1 | 5/2014 | Hasegawa et al. | |
| 2016/0245155 | A1* | 8/2016 | Iwata | F02B 37/10 |

FOREIGN PATENT DOCUMENTS

| | | | |
|---|---|---|---|
| JP | 2007-071136 A | | 3/2007 |
| JP | 2007071136 A | * | 3/2007 |
| JP | 2008-163794 A | | 7/2008 |
| KR | 10-2006-0096306 A | | 9/2006 |
| KR | 10-1382767 B1 | | 4/2014 |

\* cited by examiner

APPARATUS AND METHOD FOR ENGINE CONTROL

CROSS-REFERENCE TO RELATED APPLICATION

This application claims the benefit of priority to Korean Patent Application No. 10-2016-0068777, filed with the Korean Intellectual Property Office on Jun. 2, 2016, the entire contents of which are incorporated herein by reference.

TECHNICAL FIELD

The present disclosure relates to an apparatus and a method for controlling an engine. More particularly, the present disclosure relates to an apparatus and a method for controlling an engine having a turbocharger and an electric supercharger that can increase a compression ratio.

BACKGROUND

An engine appropriately mixes air and fuel and generates driving power by burning the mixed gas. In order to obtain required output power and combustion efficiency, sufficient air should be supplied to the engine. For this, a turbocharger may be used to increase combustion efficiency and supply sufficient, or additional, air to the engine.

Generally, a turbine of a turbocharger is rotated by pressure of exhaust gas exhausted from the engine, a compressor of the turbocharger compresses fresh air flowing in from the outside, and the compressed air is supplied to a combustion chamber of the engine. The turbocharger has been applied to most diesel engines, and has recently been applied to gasoline engines.

The turbocharger includes a waste gate valve that adjusts an exhaust gas amount supplied to the turbine from the cylinder. However, the waste gate valve used for the turbocharger may be expensive.

As another example, an electric supercharger compresses external air using a compressor operated by a motor. Since the electric supercharger is operated by the motor, there is little turbo lag. The electric supercharger mainly supplies compressed air to the cylinder in a low speed and low load region.

The turbocharger (hereinafter referred to as a 'mechanical turbocharger', if necessary) operated by exhaust gas has low responsiveness, and there is much remaining gas in a combustion chamber because of high back pressure. Thus, abnormal combustions, such as knocking or pre-ignition in the combustion chamber, may occur in the combustion chamber, so it is difficult to realize the engine having a high compression ratio.

Further, the electric supercharger has high responsiveness, but output of a motor of the electric supercharger is limited by a limitation of an electric system of a vehicle. So boosting by the electric supercharger is mainly limited to a low-speed and a middle-speed region.

Therefore, in an engine having the mechanical turbocharger and the electric supercharger, an apparatus for controlling the engine that can improve fuel consumption by realizing a high compression ratio is required.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and a method for controlling an engine that can improve fuel consumption by realizing high compression ratio.

Further, the present disclosure has been made in an effort to provide an apparatus and a method for controlling an engine that can minimize abnormal combustions, such as knocking or pre-ignition, by reducing a back pressure of exhaust gas exhausted from a combustion chamber and remaining gas in a combustion chamber.

Further, the present disclosure has been made in an effort to provide an apparatus and a method for controlling an engine that can reduce manufacturing costs by removing an expensive waste gate valve.

An apparatus for controlling an engine according to an exemplary embodiment of the present disclosure may include an engine including a plurality of combustion chamber generating driving torque by burning fuel; a high-capacity turbocharger including a turbine rotated by the exhaust gas exhausted from the combustion chambers, and a compressor rotated together with the turbine and compressing exhaust gas exhausted from the combustion chamber; an electric supercharger including a motor and an electric compressor operated by the motor in order to supply compressed air to the combustion chamber; a throttle valve adjusting intake air amount supplied to the combustion chamber; a driving information detector detecting driving information including a required torque and an engine speed; and a controller determining a driving region of the engine from the driving information detected by the driving information detector, and controlling engine torque by adjusting opening of the throttle valve and output of the motor according to the driving region of the engine.

Entire exhaust gas exhausted from the combustion chamber may flow into the turbine disposed in an exhaust line through an exhaust manifold, and be exhausted to outside passing through the turbine.

The driving region of the engine may be divided into a low-load region, a low/middle-speed and high-load region, and a high-speed and high-load region.

The controller may control the engine torque by adjusting opening of the throttle valve when the driving region of the engine is the low-load region, may control the engine torque by maximally opening the throttle valve and adjusting output of the motor when the driving region of the engine is the low/middle-speed and high-load region, and may control the engine torque by adjusting opening of the throttle valve and an air supercharged by the turbocharger when the driving region of the engine is the high-speed and high-load region wherein the controller controls the opening of the throttle valve by considering an intake air amount based on a pressure ratio between a front end and a rear end of the throttle valve.

A method for controlling an engine including an engine including a plurality of combustion chamber; a high-capacity turbocharger operated by exhaust gas exhausted from the combustion chamber and compressing intake air; an electric supercharger including a motor and an electric compressor operated by the motor for supplying compressed air to and the combustion chamber; and a throttle valve adjusting intake air amount supplied to the combustion chamber; according to another exemplary embodiment of the present disclosure, the method may include, by a driving information detector, detecting a driving information including a required torque of a driver, an engine speed and an engine torque; by a controller, determining a driving region of the engine from the driving information; and by the controller, controlling an engine torque by adjusting opening of a throttle valve and an output of the motor according to the driving region of the engine.

The driving region of the engine may be divided into a low-load region, a low/middle-speed and high-load region, and a high-speed and high-load region.

The engine torque may be controlled by adjusting opening of the throttle valve when the driving region of the engine is the low-load region, the engine torque may be controlled by maximally opening the throttle valve and adjusting output of the motor when the driving region of the engine is the low/middle-speed and high-load region, and the engine torque may be controlled by adjusting opening of the throttle valve and an air supercharged by the turbocharger when the driving region of the engine is the high-speed and high-load region wherein the opening of the throttle valve is controlled by considering an intake air amount based on a pressure ratio between a front end and a rear end of the throttle valve.

According to an exemplary embodiment of the present disclosure, since torque depending on engine speed is controlled by a throttle valve and an electric supercharger, back pressure and remaining gas in a combustion chamber are reduced and thus abnormal combustion can be minimized.

Further, since back pressure is reduced, it is possible to increase compression ratio, and thus fuel consumption is improved.

Further, since expensive waste gate valve can be removed, manufacturing cost is reduced.

BRIEF DESCRIPTION OF THE DRAWINGS

The drawings are provided for reference in describing exemplary embodiments of the present disclosure, and the spirit of the present disclosure should not be construed only by the accompanying drawings.

DETAILED DESCRIPTION

Figure 1:
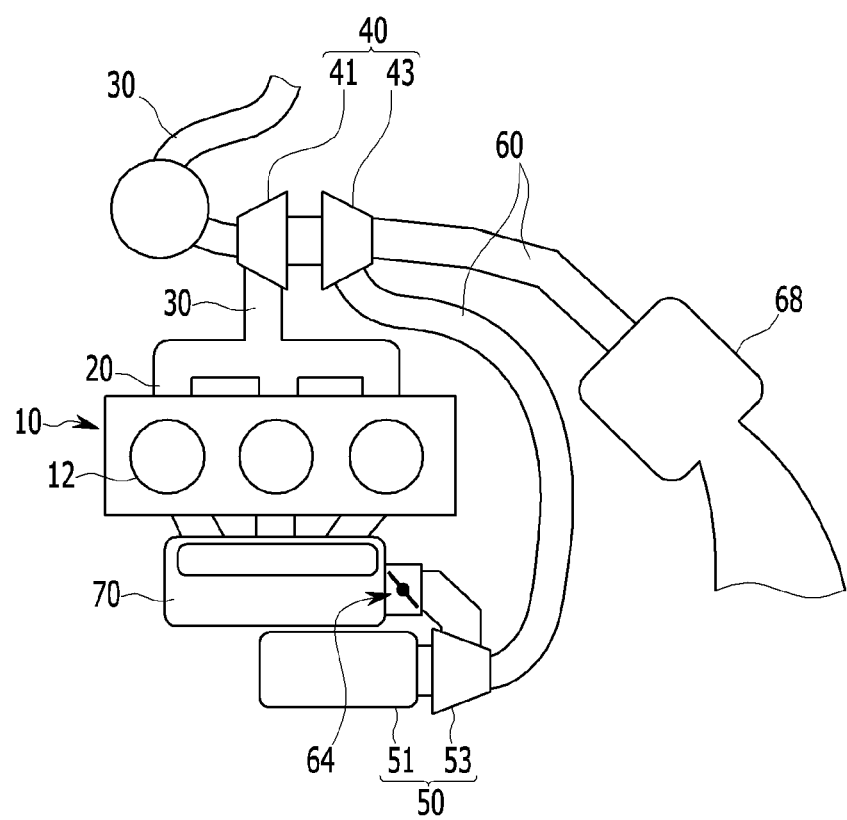
FIG. 1 is a schematic view illustrating an apparatus for controlling an engine according to an embodiment of the present disclosure.
Figure 1:
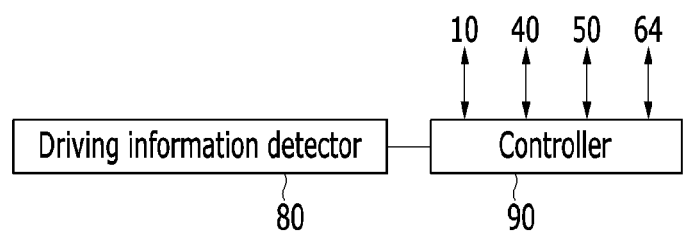

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clearly describe the present disclosure, portions that are not connected with the description will be omitted. Like reference numerals designate like elements throughout the specification.

In addition, the size and thickness of each configuration shown in the drawings are arbitrarily shown for better understanding and ease of description, but the present disclosure is not limited thereto. In the drawings, the thickness of layers, films, panels, regions, etc., may be exaggerated for clarity.

Hereinafter, an apparatus and a method for controlling an engine according to embodiments of the present disclosure will be described in detail with reference to accompanying drawings.

FIG. 1 is a schematic view illustrating an apparatus for controlling an engine according to an embodiment of the present disclosure.

As shown in FIG. 1, an apparatus for controlling an engine according to an exemplary embodiment of the present disclosure may include an engine 10 including a plurality of combustion chamber 12 generating driving torque by burning fuel, a high-capacity turbocharger 40 for supplying supercharged air to the combustion chamber 12, an electric supercharger 50 operated by a motor 51 and an electric compressor for supplying supercharged air to the combustion chamber 12, a throttle valve 64 adjusting an intake air amount supplied to the combustion chamber 12, a driving information detector 80 for detecting a driving information and a controller 90 for controlling operation of the engine 10, the turbocharger 40, the electric supercharger 50 and the throttle valve 64.

The high-capacity turbocharger 40 supplies supercharged air to the combustion chamber 12, and may include a turbine 41 rotated by the exhaust gas exhausted from the combustion chamber 12 and a compressor 43 being rotated by rotation force of the turbine 41 and turbocharging the intake air.

Exhaust gas exhausted from the combustion chamber 12 of the engine 10 is exhausted to outside through an exhaust manifold 20 and an exhaust line 30. At this time, the turbine 41 is disposed in the exhaust line 30, the turbine 41 is rotated by exhaust gas, the compressor 43 is rotated by a rotation force of the turbine 41, and the compressor 43 compresses intake air supplied to the combustion chamber. The intake air may include external air (fresh air) and exhaust gas.

All of the exhaust gas exhausted from the combustion chamber 12 may be supplied to the turbine 41 disposed in the exhaust line 30 through the exhaust manifold 20. Exhaust gas operating the turbine 41 is exhausted outside through the exhaust line 30.

In the conventional art, a detour line for detouring exhaust gas supplied to the turbine 41 and a waste gate valve for adjusting amount of exhaust gas supplied to the turbine 41 are required. However, according to an exemplary embodiment of the present disclosure, the detour line and the waste gate valve are not necessary. Detailed reasons will be described.

According to the present disclosure, since the high-capacity turbocharger is disposed as compared to a conventional turbocharger, it is possible to reduce a back pressure of exhaust gas.

The electric supercharger 50 supplies supercharged air to the combustion chamber 12, and includes a motor 51 and an electric compressor 53. The electric compressor 53 is operated by the motor 51 and compresses intake air, and the compressed air is supplied to the combustion chamber 12.

The compressor 43 of the turbocharger 40 and the electric supercharger 50 are disposed in an intake line 60 that intake air flows. An air cleaner 68 for filtering external air is disposed in an inlet of the intake line 60.

The compressor 43 of the turbocharger 40 may be disposed in an upstream side of the intake line 60, and the electric supercharger 50 is disposed in downstream side of the intake line 60. Intake air flowing into the intake line 60 is supplied to the combustion chamber 12 through intake manifold 70. The throttle valve 64 is disposed in the intake manifold 70, and an intake air amount supplied to the combustion chamber 12 is adjusted by opening the throttle valve 64.

The driving information detector 80 detects a pressure ratio between a front end and a rear end of the throttle valve 64, and driving information including a required torque and an engine speed is transmitted to the controller 90. The pressure ratio may be detected by a pressure, the required torque may be detected by an accelerator pedal sensor (APS) (not shown), the engine speed may be detected by a speed sensor detecting rotation speed of a crankshaft. That is, the driving information detector 80 may include the APS, the speed sensor and the pressure sensor.

Meanwhile, the engine system may further include a LP-EGR (low pressure exhaust gas recirculation) apparatus 110 and a HP-EGR (high pressure exhaust gas recirculation).

In an embodiment, the LP-EGR apparatus 110 includes a LP-EGR line 111, LP-EGR cooler 113 and a LP-EGR valve 115. The LP-EGR line 111 is branched from the exhaust line 30 of a downstream portion of the turbine 41 and joined to the intake line 60 of an upstream portion of the compressor 43. The LP-EGR cooler 113 is disposed at the LP-EGR line 111 and cools the recirculation gas. The LP-EGR valve 115 is disposed at a portion where the LP-EGR line 111 and the intake line 60 are joined, and adjusts a recirculation gas amount by a control signal of the controller 90.

The HP-EGR apparatus 120 may include a HP-EGR line 121, a HP-EGR cooler 123 and a HP-EGR valve 125. The HP-EGR line 121 is branched from the exhaust line of an upstream portion of the turbine 41 and joined to the intake line 60 of a downstream portion of the compressor 43. The HP-EGR cooler 123 is disposed at the HP-EGR line 121 and cools the recirculation gas. The HP-EGR valve 125 is disposed at a portion where the HP-EGR line 121 and the intake line 60 are joined and adjusts a recirculation gas amount by a control signal of the controller 90.

The controller 90 determines a driving region of the engine 10 from the driving information detected by the driving information detector 80, and controls an engine torque by adjusting an opening of the throttle valve 64 and an output of the motor 51 according to the driving region of the engine 10.

The controller 90 may be implemented with one or more microprocessors operated by a predetermined program or hardware including the microprocessor, and the predetermined program may include a series of commands for performing the method for controlling the engine according to an exemplary embodiment of the present disclosure to be described.

The driving region of the engine may be divided into a low-load region, a low/middle-speed and high-load region and a high-speed and high-load region. In the specification, the low/middle-speed region may include a low-speed region and a middle-speed region.

Hereinafter, a method for controlling the engine according to an exemplary embodiment of the present disclosure will be described in detail with reference to the accompanying drawings.

Figure 3:
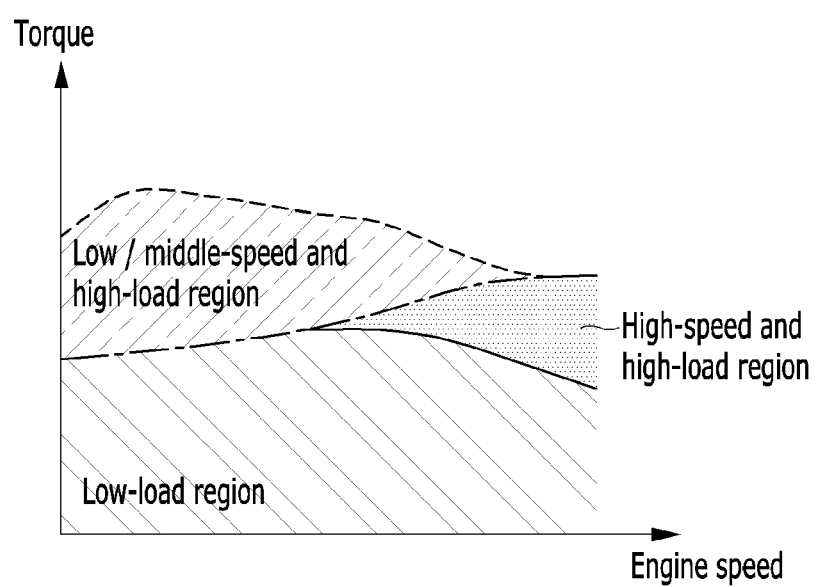
FIG. 3 is a graph illustrating a driving region according to an embodiment of the present disclosure.
Figure 4:
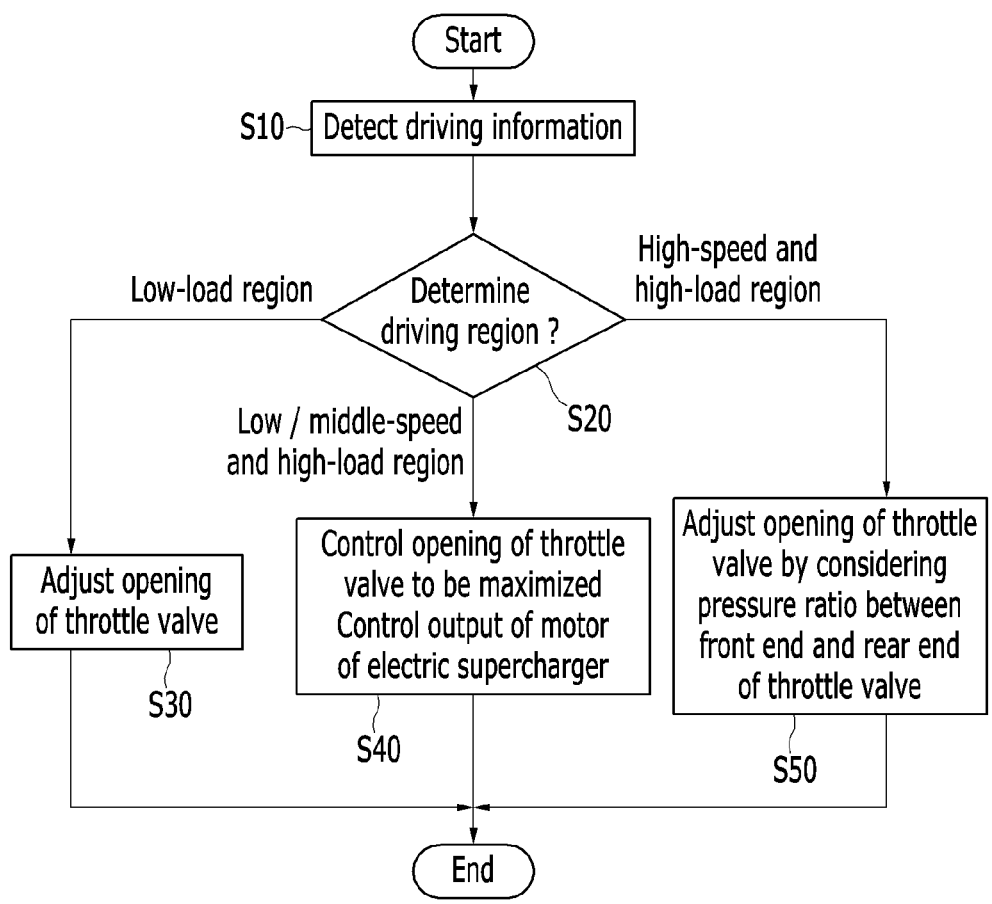
FIG. 4 is a flowchart illustrating a method for controlling an engine according to an embodiment of the present disclosure.

FIG. 3 is a graph illustrating a driving region according to an embodiment of the present disclosure. FIG. 4 is a flowchart illustrating a method for controlling an engine according to an embodiment of the present disclosure.

Referring to FIG. 3 and FIG. 4, the driving information detector 80 may detect the driving information including the required torque and the engine speed, and transmit the driving information to the controller 90 at step S10.

The controller 90 determines the driving region from the driving information at step S20. As described above, the driving region may be divided into the low-load region, the low/middle-speed and high-load region and the high-speed and high-load region.

The controller 90 controls engine torque by adjusting an opening of the throttle valve 64 and an output of the motor 51 according to the driving region of the engine.

In detail, when the driving region of the engine is the low-load region, the controller 90 controls the engine torque by adjusting opening of the throttle valve 64 at step S30.

In the low-load region, the controller 90 does not operate the electric supercharger 50 and controls the engine torque by adjusting an opening of the throttle valve 64. When opening of the throttle valve 64 is increased, the engine torque is increased as an air amount and fuel supplied to the combustion chamber 12 is increased. In the contrary, when an opening of the throttle valve 64 is decreased, the engine torque is decreased as air amount and fuel supplied to the combustion chamber 12 is decreased.

When the driving region of the engine is the low/middle-speed and high-load region, the controller 90 controls opening of the throttle valve 64 to be maximized and controls the engine torque by adjusting output of the motor 51 at step S40.

In the low/middle-speed and high-load region, the controller 90 fully opens the throttle valve 64 such that an air amount and fuel supplied to the combustion chamber 12 are maximized. At this time, a limitation of the engine torque that can be controlled by opening of the throttle valve 64 is given in a solid line of FIG. 2.

Then, the controller 90 adjusts an amount of supercharged air supplied to the combustion chamber 12 through the output of the motor 51, and thus the engine torque is controlled. That is, when the output of the motor 51 is increased, the engine torque is increased as an amount of supercharged air supplied to the combustion chamber 12 is increased by the electric compressor 53. On the contrary, when the output of the motor 51 is decreased, the engine torque is decreased as an amount of supercharged air supplied to the combustion chamber 12 is decreased by the electric compressor 53.

Figure 2:
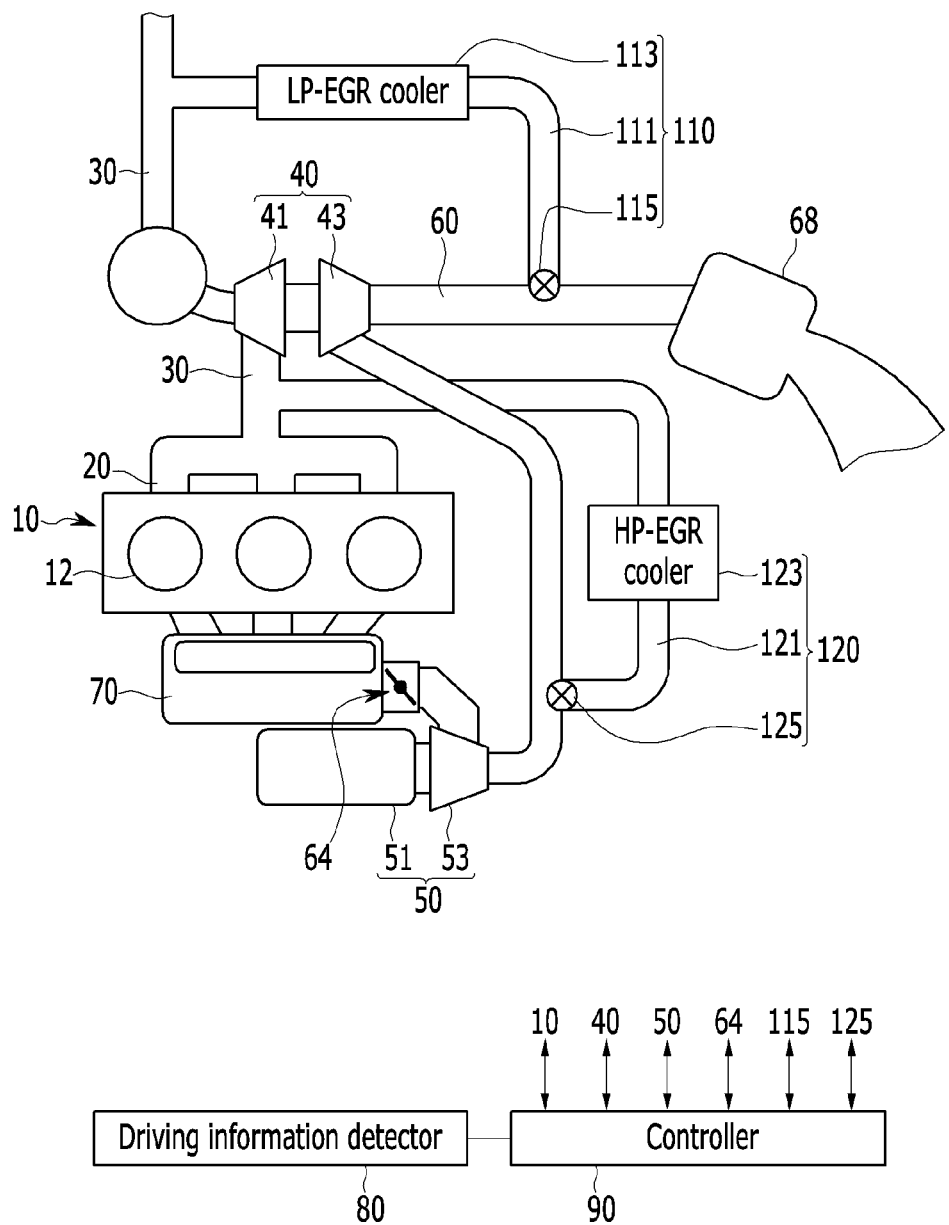
FIG. 2 is a schematic view illustrating an apparatus for controlling an engine according to another embodiment of the present disclosure.

At this time, a limitation of the engine torque that can be controlled by the electric supercharger 50 is given in a dotted line of FIG. 2.

Meanwhile, when the driving region of the engine is the low-load region, since an exhaust gas amount exhausted from the combustion chamber 12 is very small and a capacity of the turbocharger 40 is very high, an amount of boosting by the turbocharger 40 is low. Therefore, an effect of the turbocharger 40 on the engine torque is very small.

When the driving region of the engine is the high-speed and high-load region, the controller 90 controls the engine torque by adjusting an opening of the throttle valve 64 and thus an air supercharged by the turbocharger 40 at step S50. At this time, the controller 90 may control the opening of the throttle valve by considering an intake air amount based on the pressure ratio between the front end and the rear end of the throttle valve 64. That is, since the turbocharger 40 is operated in the high-speed and high-load region, the engine torque is affected by air supercharged by the turbocharger 40. Therefore, the opening of the throttle valve 64 may be adjusted by considering the intake air amount based on the pressure ratio between the front end and the rear end of the throttle valve 64 in order to reflect the operation of the turbocharger 40.

In the high-speed and high-load region, the controller 90 may not operate the electric supercharger 50 and may control the engine torque by adjusting an opening of the throttle valve 64.

In the high-speed and high-load region, since an exhaust gas amount exhausted from the combustion chamber 12 is large, an amount of supercharged air supplied to the combustion chamber 12 naturally occurs by the turbocharger 40, and thus the engine torque is increased. That is, since an exhaust gas amount is increased as the engine speed and the engine torque are increased, an amount of supercharged air is naturally increased, and thus the engine torque is increased. Therefore, the controller 90 controls the engine torque by adjusting an opening of the throttle valve 64.

In the high-speed and high-load region, a limitation of the engine torque that can be controlled by the turbocharger 40 and the opening of the throttle valve 64 is shown in a one-point chain line of FIG. 2.

As described above, according to embodiments of the present disclosure, since the engine torque is controlled by the throttle valve 64 and electric supercharger 50 according to the driving region depending on the engine speed and the engine torque, it is possible to reduce a back pressure of exhaust gas.

According to the conventional art, since boosting by the turbocharger occurs in the low-load region, a back pressure of exhaust gas is increased. However, according to an embodiments of the present disclosure, since the high-capacity turbocharger 40 is mounted, an effect of the turbocharger 40 to the engine torque is very small. Supercharged air is supplied to the combustion chamber 12 through the electric supercharger 50. Therefore, it is possible to minimize a back pressure of exhaust gas, and thus a high-compression ratio engine can be realized and abnormal combustion can be minimized. Since a high-compression ratio engine can be realized, fuel consumption of the vehicle is improved.

Further, since an amount of supercharged air is not controlled by the waste gate valve, it is possible to remove an expensive waste gate valve, an thereby manufacturing cost of the vehicle can be reduced.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for controlling an engine, comprising:
an engine including a plurality of combustion chambers for generating driving torque by burning a fuel;
a high-capacity turbocharger including a turbine rotated by the exhaust gas exhausted from the combustion chambers and a compressor rotated together with the turbine for compressing exhaust gas exhausted from the combustion chamber;
an electric supercharger including a motor and an electric compressor operated by the motor in order to supply compressed air to the combustion chamber;
a throttle valve for adjusting an intake air amount supplied to the combustion chamber;
a plurality of sensors for detecting driving information including a required torque and an engine speed; and
a controller for determining a driving region of the engine from the driving information detected by the plurality of sensors, and controlling engine torque by adjusting an opening of the throttle valve and an output of the motor according to the driving region of the engine,
wherein the driving region of the engine is divided into a low-load region, a low/middle-speed and high-load region and a high-speed and high-load region,
wherein the controller:
controls the engine torque by adjusting an opening of the throttle valve when the driving region of the engine is the low-load region,
controls the engine torque by maximally opening the throttle valve and adjusting an output of the motor when the driving region of the engine is the low/middle-speed and high-load region, and
controls the engine torque by adjusting the opening of the throttle valve and an air supercharged by the turbocharger when the driving region of the engine is the high-speed and high-load region, and
wherein the controller controls the opening of the throttle valve by considering an intake air amount based on a pressure ratio between a front end and a rear end of the throttle valve.

2. The apparatus of claim 1, wherein all of the exhaust gas exhausted from the combustion chamber flows into the turbine disposed in an exhaust line, and the exhaust gas is exhausted to an outside through the exhaust line.

3. A method for controlling an engine, the engine including a plurality of combustion chambers; a high-capacity turbocharger operated by exhaust gas exhausted from the combustion chamber and compressing intake air; an electric supercharger including a motor and an electric compressor operated by the motor for supplying compressed air to the combustion chamber; and a throttle valve adjusting an intake air amount supplied to the combustion chamber; the method comprising:
detecting a driving information including a required torque of a driver, an engine speed and an engine torque using a plurality of sensors;
determining a driving region of the engine from the driving information using a controller; and
controlling, by the controller, an engine torque by adjusting an opening of a throttle valve and an output of the motor according to the driving region of the engine,
wherein the driving region of the engine is divided into a low-load region, a low/middle-speed and high-load region and a high-speed and high-load region, and
wherein the engine torque is controlled by adjusting an opening of the throttle valve when the driving region of the engine is the low-load region,
the engine torque is controlled by maximally opening the throttle valve and adjusting an output of the motor when the driving region of the engine is the low/middle-speed and high-load region, and
the engine torque is controlled by adjusting the opening of the throttle valve and an air supercharged by the turbocharger when the driving region of the engine is the high-speed and high-load region, wherein the opening of the throttle valve is controlled by considering an intake air amount based on a pressure ratio between a front end and a rear end of the throttle valve.

* * * * *